Aug. 4, 1964   J. H. ARNOLD, JR., ETAL   3,143,071
SELF-ARMED AND ACTUATED BOMB
Filed Nov. 29, 1960                2 Sheets-Sheet 1
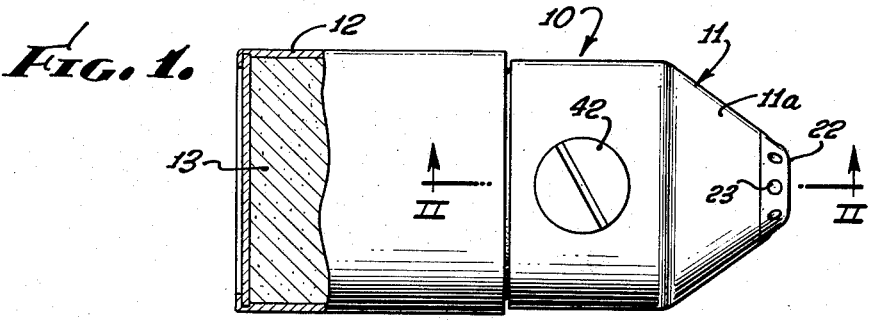
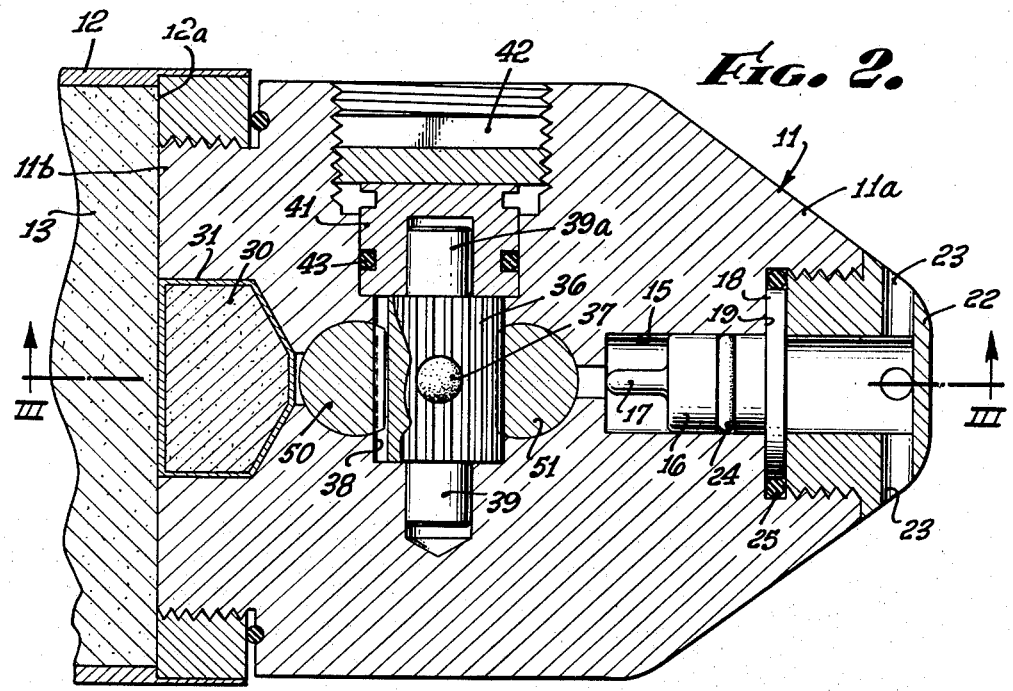
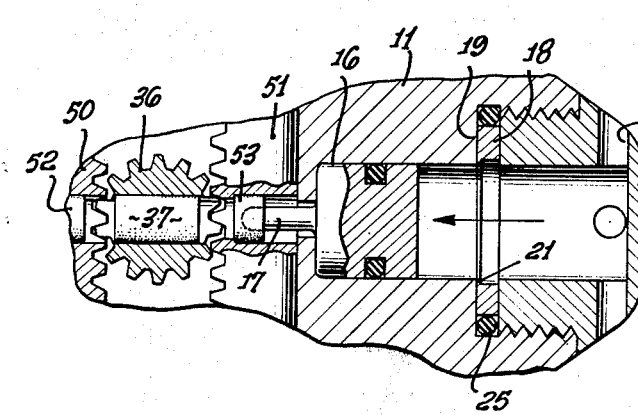
JACK H. ARNOLD, JR.
HAROLD J. JAEGER
INVENTORS.
BY Miketta and Glenny
ATTORNEYS.

Aug. 4, 1964 J. H. ARNOLD, JR., ETAL 3,143,071
SELF-ARMED AND ACTUATED BOMB
Filed Nov. 29, 1960 2 Sheets-Sheet 2
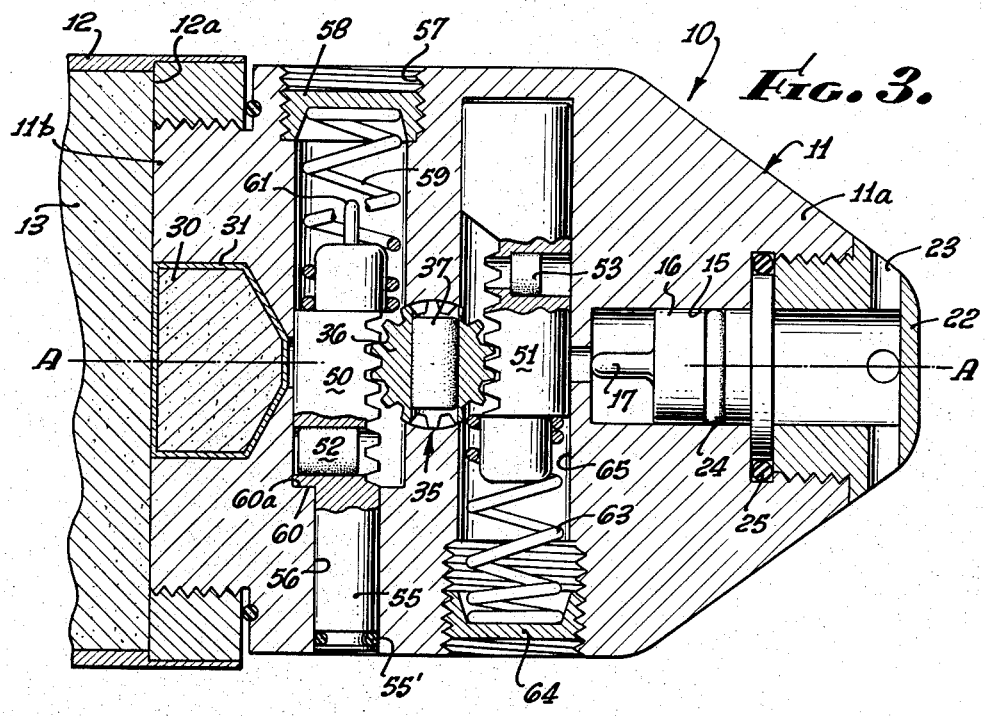
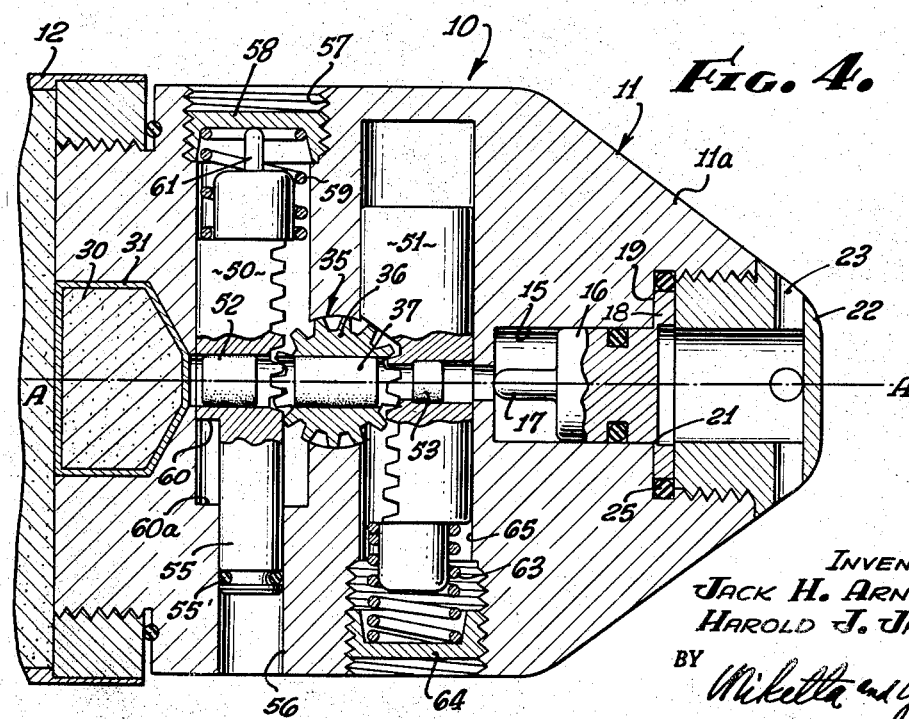
INVENTORS
JACK H. ARNOLD, JR.
HAROLD J. JAEGER
BY
ATTORNEYS.

3,143,071
SELF-ARMED AND ACTUATED BOMB
Jack H. Arnold, Jr., and Harold J. Jaeger, Newhall, Calif., assignors, by mesne assignments, to Special Devices, Inc., Newhall, Calif., a corporation of California
Filed Nov. 29, 1960, Ser. No. 72,414
5 Claims. (Cl. 102—70)

The present invention relates to a bomb which is self-armed at a predetermined ambient pressure, is self-actuated at a greater ambient pressure and is particularly useful in locating and recovering space test vehicles that may fall into the ocean.

In many instances, it is desirable to use a high explosive bomb which is unarmed during flight and is self-armed and actuated at given predetermined ambient pressures. The present invention provides such a bomb and without being limited thereto is particularly adapted for use in locating and recovering missile and space vehicles. It is understood that the present invention may have many other applications in various fields wherein a self-armed and actuated bomb is needed. However, for ease of description and for clarity, the present invention will be described in connection with locating and recovering space and missile vehicles.

At the present time, it is still impossible to safely land a missile or space vehicle on land without damaging it, its occupants or apparatus. Therefore, these vehicles are attempted to be safely recovered over water with various safety means such as nets or cables secured between aircraft flying in the vicinity in which the vehicle is calculated to land. However, due to the tremendously complicated problems in the guidance systems, the trigger or releasing mechanisms in the vehicles, the systems or apparatus used to catch the vehicles before striking the water, etc., most of the vehicles have not been recovered in the air but have fallen into the ocean. This presents a difficult task of locating and recovering the sunken vehicles. The present invention helps solve this problem.

As used herein, the term "space or missile vehicle" may include a guided missile, orbital vehicle, ballistic vehicle or test vehicle such as a data package or nose cone.

These space vehicles have been located and recovered heretofore by various means and methods, among which included a hydrostatically fired bomb carried by the vehicle. These bombs were either ejectable or non-ejectable from the vehicle. The ejectable bombs were generally fired from the vehicle by means of an electrical system and detonated at the required water depth. The non-ejectable bomb was secured to the vehicle by a frangible connection and upon flight termination impact of the vehicle, would tear loose and sink to the point of detonation.

Instrumented stations, either ships or land bases, received the sound waves propagated by the high explosive detonation and by computing the various time and direction coordinates, comparing them with data received at other such stations, could locate the point of detonation and by proximity the point of vehicle flight termination. There were several methods of instrumenting a point of impact of such a bomb. Generally, the equipment involved hydrophone receivers and sensors, either manual or electronic computation techniques, and prearranged communication with other similar stations. Directional hydrophone sensors were particularly advantageous since they indicated time of detonation by caluculating velocity of sound in water and direction of azimuth.

However, the bombs used heretofore in either the ejectable or non-ejectable system were armed during flight and were subject to predetonation. Moreover, these bombs were extremely complex, overweight, bulky and not reliable. The unreliability of these bombs has jeopardized a multi-million dollar flight test program. It is understood that the bomb of the present invention may be used on either the ejectable or non-ejectable system with complete reliability and without fear of being predetonated.

The present invention provides a pressure-actuated bomb that is unarmed during flight. The bomb is adapted to be self-armed at a predetermined pressure and is adapted to be automatically fired at a second higher predetermined pressure. The pressures at which the bomb will become armed and fired may be easily changed and calibrated. This is considered to be advantageous when more than one testing range is utilized, each range having its sound receiving station at a different pressure level. A standard bomb can thus be made and easily set to explode at the predetermined pressure required for a particular testing range.

The bomb of the present invention completely obviates all of the problems of similar type bombs used heretofore and in general utilizes a fuze member having the detonation means out-of-line with the firing pin and explosive charge while the bomb is in flight. Dual opposing pressure-actuated piston-rack members are actuated at a predetermined arming pressure to properly align the explosive charge, detonator means and firing pin and thereby arm the bomb. These pressure-actuated piston members are opposing balancing forces and allow the bomb to receive extreme exterior force loads without being affected. At a greater predetermined firing pressure, the firing pin is automatically fired causing the explosive charge to be detonated.

In the event the ambient pressure or hydrostatic pressure is reduced after the bomb becomes armed and before the bomb is fired, the bomb will again automatically become unarmed. This assures safety under any pressure environment except at the predetermined firing pressure or water depth.

Moreover, the present bomb may be non-destructively tested and calibrated for pressure accuracy prior to actual use.

Accordingly, it is a general object of the present invention to provide a self-armed and actuated bomb that avoids all of the foregoing disadvantages of similar type bombs used heretofore.

An object of the present invention is to provide a bomb which is unarmed and completely safe during flight, which is self-armed at a predetermined ambient pressure and which is self-actuated at a greater ambient pressure.

Another object is to provide a pressure-actuated bomb that will only be fired at a predetermined pressure and that will automatically become unarmed if the pressure is reduced.

A further object is to provide a pressure-actuated bomb including a fuze member having movable detonator means normally not in alignment for detonation until a predetermined ambient pressure is reached.

Still another object is to provide a pressure-actuated bomb which can easily be adjusted to become self-armed and self-actuated at different predetermined pressures.

An object is to provide a pressure-actuated bomb which can be non-destructively tested and calibrated for pressure accuracy prior to actual use.

Another object is to provide a pressure-actuated bomb which can only be detonated when the ambient pressure is equal to a predetermined pressure, and at all pressures below the predetermined pressure, the bomb is safe and cannot be detonated, even accidentally.

An object is to provide a self-armed and actuated bomb that is simple, lightweight, economical to make, and extremely reliable.

Other objects and advantages of this invention will be readily apparent from the following description when considered in connection with the appended drawings.

In the drawings:

FIG. 1 is a side elevational view, partly in section, of an exemplary bomb of the present invention;

FIG. 2 is an enlarged, longitudinal section of the bomb taken along plane II—II of FIG. 1;

FIG. 3 is a longitudinal section of the bomb taken along plane III—III of FIG. 2, with the detonator means of the bomb in the unarmed position;

FIG. 4 is a longitudinal section of the bomb similar to FIG. 3 with the detonator means of the bomb in the armed position;

FIG. 5 is a fragmentary longitudinal section of the bomb similar to FIGS. 3 and 4 but after the firing pin has been fired and has struck the detonator means which was in the armed position.

The exemplary bomb 10 of the present invention includes a fuze member 11 threadedly connected to a container 12 housing a high explosive charge 13. It is understood that the fuze member 11 may be hydrostatically armed and fired at predetermined pressures.

The high explosive charge 13 may be preferably of a cylindrical shape and may be secured within the container 12 by well known conventional means. The front portion 12a of the container 12 is open and receives the rear portion 11b of the fuze member 11. It is therefore understood that the front portion of the explosive charge 13 is in direct contact with the rear portion 11b of the fuze member 11.

The bomb 10 may be of any suitable shape but preferably is cylindrical and its length is governed by the size of the explosive charge 13. For example, the bomb may range from about eight inches long for a bomb containing a one pound explosive to fourteen inches long for a bomb containing twelve pounds of explosive charge. While there are various ways of making the explosive charge 13 and various materials may be used, it has been found that a castable explosive is easy to load and may be made from HBX, Composition B, Octol, Torpex, TNT.

The fuze member 11 may contain two main elements: a firing pin and a detonator means for detonating the explosive charge 13 after the firing pin has been released. The fuze member 11 features an out-of-line arming action whereby the firing pin, detonator means and explosive charge are not in alignment with each other. This allows the bomb to be unarmed until a predetermined ambient pressure is reached.

The detonator means and the firing pin are adapted to be moved relative to each other between an unarmed position (FIG. 3) wherein the firing pin, detonator means and explosive charge are out of axial alignment with each other and an armed position (FIG. 4) wherein the firing pin, detonator means and explosive charge are in axial alignment with each other. The longitudinal axis A—A through the fuze member 11 is considered to be the arming and reference axis passing through the firing pin, detonator means and explosive charge when they are in alignment.

The front portion 11a of the fuze member 11 may be provided with a front chamber 15 slidably receiving a firing pin 16. The arming axis A—A may be concentric with chamber 15. The firing pin 16 may be provided with a rearwardly extending striking hammer 17 adapted to strike and engage the detonator means.

As best seen in FIGS. 2 and 4, the firing pin 16 may be provided with an annular, transversely extending shoulder 18 engaging stops 19 on the fuze member 11. The annular shoulder 18 and stops 19 hold the firing pin stationary and prevent the firing pin 16 from contacting the detonator means. The annular shoulder 18 is connected to the firing pin 16 by means of a thin, annular, weakened section 21 (FIG. 4). As described in detail hereinafter, the thin weakened section 21 may be varied in thickness depending upon a predetermined firing pressure at which the firing pin 16 is designed to be severed and fired.

A hollow nose cap 22 may be threadedly secured into the front portion of chamber 15 for forcing the annular shoulder 18 of the firing pin 16 into tight engagement with the stops 19. The nose cap 22 is provided with a plurality of transverse ports 23 communicating the interior of the cap with the exterior. As will be described and understood hereinafter, fluid pressure is adapted to pass through ports 23 and exert pressure against the firing pin 16.

An O-ring 24 may be provided within a suitable groove around the firing pin 16 to prevent fluid leakage into the fuze. In addition, a second O-ring 25 may be provided between the annular shoulder 18 and fuze member 11 to further prevent any leakage.

It is understood that dependent upon the material used for the firing pin 16 and the thin annular section 21, as well as the thickness of the thin section 21, the pressure at which the firing pin 16 will be released can vary and be easily changed to suit the particular requirements of a testing range. When sufficient pressure builds up in the hollow cap 22 and against the piston 16, the thin area 21 will be sheared causing the firing pin to move rearwardly. It is thus understood that pressure responsive firing means may be provided for automatically releasing and firing the firing pin 16 to strike a detonator means in the armed position.

Along the axis A—A and carried within the rear portion 11b of the fuze member 11 may be provided a booster charge 30 adapted to be detonated for exploding the main explosive charge 13. As shown, a thin membrane or retaining cover 31 may be provided around the booster charge 30. The rear portion of the booster charge 30 is in direct contact with the high explosive charge 13 except for the thin membrane retaining cover 31. The cover 31 may be made of any suitable material that is easily rupturable and is frangible such as thin plastic.

A detonator means 35 is carried by the fuze member 11 between the booster charge 30 and the firing pin 16. Pressure responsive alignment means is provided for relatively moving the firing pin and detonator means 35 from the unarmed position of FIG. 3 to the armed position of FIG. 4 when the ambient exterior pressure equals a predetermined arming pressure.

The detonator means 35 may include a rotatable pinion member 36 rotatably mounted about a transverse axis and carrying a cylindrical detonator charge 37 exposed at both ends. The detonator charge 37 has an axis which is out of alignment with the arming axis A—A in the unarmed position of FIG. 3.

As best seen in FIG. 2, the pinion member 36 may be received in a transverse chamber 38 provided in the fuze member 11. The pinion member 36 is provided with oppositely extending butt shafts 39 and 39a, butt shaft 39 being journalled on the fuze member 11 and butt shaft 39a being journalled in a pinion bearing 41 inserted into chamber 38 and locked therein by means of a pinion plug 42 threadedly received in the entrance of the chamber 38. A suitable O-ring 43 may be provided around the pinion bearing 41 to prevent fluid leakage into the chamber 38.

A pair of rack members 50 and 51 are mounted to move in opposite directions within the fuze member 11 and in a plane common to each other and normal to the axis of the rotatable pinion member 36. One of the rack members 50 is mounted between the pinion member 36 and the booster charge 30 and is in engagement or mesh with the pinion member 36. The rack member 50 carries a cylindrical relay charge 52 having an axis substantially parallel to and out of alignment with the arming axis A—A in the unarmed position as shown in FIG. 3.

The other rack member 51 is movably mounted between the pinion member 36 and the firing pin 15 and is in mesh or engagement with the pinion member 36. The rack member 51 carries a cylindrical primer charge 53 having an axis substantially parallel to and out of alignment with the arming axis A—A in the unarmed position shown in FIG. 3.

A piston member 55 is slidably mounted in a transverse bore 56 provided in the fuze member 11 and contacts the rack member 50 at one end thereof and the other end is in communication with the exterior. It is understood that piston 55 and rack 50 may be integral. An O-ring or any other suitable sealing means 55' is provided around the piston 55 for preventing fluid leakage.

Fluid pressure is adapted to contact and engage the exposed end of the piston 55 for moving the piston and rack 50 upwardly as shown in the drawings. Upon movement of the rack 50, the pinion 36 is rotated in a clockwise direction as shown in FIGS. 3 and 4 causing the rack 51 to move downwardly.

The piston 55 and rack 50 are slidably assembled in the bore 56 through an opening 57 provided on the opposite side of the fuze member 11. A shoulder 60 on piston 55 is adapted to engage an abutment 60a on the fuze element 11 to prevent the rack and piston 55 from passing through bore 56. A closure cap 58 is threadedly provided in the opening 57 for preventing removal of the piston and rack members 50 and 55. A spring member 59 may be provided between the closure cap 58 and the rack 50. The upper portion of the rack 50 is provided with a stop 61 which is adapted to engage the inner surface of the closure cap 58 when the relay charge 52 has been moved into alignment with the arming axis A—A as shown in FIG. 4. It is thus understood that the rack 50 is limited in its upward movement so that when the stop 61 is in engagement with the closure cap 58, the relay charge is in the arming position.

The pressure alignment means for aligning the detonator means, explosive charge and firing pin may include spring means for resisting relative movement of the rack members and pinion member and for returning the rack members and pinion member to the unarmed position when the ambient exterior pressure is less than the predetermined pressure required to arm the fuze. One exemplary means includes a coiled spring 63 between the lower end of the rack 51 and an adjusting cap 64 threadedly provided in the opening of chamber 65 in which rack 51 is adapted to move. The spring 63 normally biases the rack 51 into the unarmed position as shown in FIG. 3. When the rack 50, pinion 36 and rack 51 are moved in response to ambient pressure on the open end of the piston 55, the coiled spring 63 is compressed and resists movement of the rack 51.

It is understood that the cap 64 may be threadedly adjusted to vary the pressure of the spring 63. This in effect changes the predetermined pressure at which the fuze member will become armed. The spring 63 resists movement of both rack members 50 and 51 and the pinion member 36 in response to ambient pressure on the open end of the piston 55. It is further understood that even after the fuze member has become armed as shown in FIG. 4, the spring member 63 will force the members 50 and 51 to return to the unarmed position in the event the ambient pressure is reduced below the predetermined pressure required to arm the device.

The strength of the spring 63 is not required to be critical as the pressure exerted by the spring may be varied due to the adjustment of the cap closure 64. This reduces expensive and critically designed elements thereby providing an economical fuze member.

The detonator means 35 therefore comprises a pair of oppositely movable rack members 50 and 51 which are adapted to carry explosive charges from out-of-alignment with the firing pin into alignment with the booster charge 30 and the firing pin 16. These oppositely pressure-actuated racks are opposing balancing forces thus providing a balanced pressure-actuated bomb.

It is understood that various materials can be used for the detonating charges. Without being limited thereto, exemplary materials for the detonating charges may be as follows: the percussion primer 53 may be MK 42 comprising potassium chlorate and lead sulfocynate; the detonator 37 may be MK 50 comprising lead Azid and Tetryl; the relay charge may be RDX comprising Cyclotrimethylene-Trinitramine-$(CH_2)^3$ $(NNO_2)^3$; and the booster charge 30 may be RDX plus three percent wax.

In operation, it can thus be understood that the exemplary bomb 10 of the present invention may be connected to a missile vehicle or the like prior to launching. At this stage, it is understood that the fuze element 11 of the present invention is completely unarmed as shown in FIG. 3. The firing pin 16, percussion primer 53, detonator charge 37, relay charge 52, booster charge 30 and explosive charge 13 are out-of-alignment with each other. Even if the firing pin 16 was accidentally severed and released, there could be no detonation.

After the vehicle has been launched and prior to actual landing at its destination, the bomb 10 of the present invention may be ejected from the vehicle. In the event a non-ejectable system is used, it is understood that the bomb 10 may be secured by means of a frangible connection to the vehicle. Therefore, when the vehicle strikes the water, the bomb 10 will be severed from the vehicle.

In the unarmed condition (FIG. 3), the bomb 10 will sink to a given depth at which the hydrostatic pressure is greater than the strength of spring means 59 and 63 within the fuze element. This a predetermined arming pressure and as described above, this predetermined pressure may be changed dependent upon testing conditions.

At this predetermined arming pressure, the piston 55 will be forced inwardly moving the rack 50 upwardly until the stop 61 is bottomed against the cap closure 58. At the same time, the pinion member 36 is rotated and the rack member 51 is moved downwardly against the pressure of spring 63. The detonator means 35 is now in the armed position shown in FIG. 4 wherein the axes of the relay charge 52, the detonator charge 37 and percussion primer 53 coincide and are in alignment with the arming axis A—A. Therefore, the charges of the detonator means are in alignment with the firing pin 16, booster charge 30 and main explosive charge 13.

The bomb continues to sink at the same rate to a depth where the ambient exterior pressure is greater than the predetermined pressure required to arm the fuze member. This is a predetermined firing pressure and it is designed to shear or sever the firing pin 16 from the shoulder 18 by causing the thin weakened section 21 to fail. At the lower firing depth, the hydrostatic pressure flows through the ports 23 and engages the forward end of the firing pin 16. When the pressure reaches the fail point of the thin weakened annular section 21, the firing pin 16 is sheared. The hammer element 17 of the firing pin 16 is forced rearwardly and strikes the percussion primer 53 as shown in FIG. 5. It is clearly understood that after the firing pin 16 has been sheared from the annular shoulder 18, it functions as a piston with the hydrostatic pressure acting as the driving means behind the piston. The percussion primer 53 activates the detonator charge 37 which explodes the relay charge 52 causing the thin retaining cover 31 to be ruptured and causing the booster charge 30 to be exploded. The booster charge 30 in turn detonates the main explosive charge 13. The resultant detonation propagates the sound waves through the water which are monitored to determine the location of the point of impact of the bomb and vehicle.

The bomb of the present invention is considered to be the safest bomb of its type as it cannot be accidentally detonated. Moreover, the bomb is economical to manufacture as it requires a minimum of precision machine operations thus minimizing the problem areas with respect to quality control. Moreover, the entire fuze element may be non-destructively tested for depth or pressure accuracy prior to use. This can easily be accomplished by inserting the fuze element into a pressure chamber without the explosive charges present.

The bomb is completely self-arming and self-actuating and requires no outside controls after it is attached to the vehicle. In addition, the bomb can be calibrated prior to use and while it is being tested. By changing the thickness and material of the thin weakened section 21 of the firing pin 16 as well as adjusting the pressure on the spring 63 by means of the adjusting cap 64, the arming and firing pressures may be easily changed. By including means for varying the pressure of the spring means and thus changing the predetermined pressure at which the fuze member will become armed, precision springs are not required.

Obviously, many modifications and variations of the present invention are possible in the light of the above teachings. It is therefore to be understood that within the scope of the appended claims, the invention may be practiced otherwise than as specifically described.

We claim:

1. In a pressure-actuated bomb having a main explosive charge, adapted to be self-armed at a predetermined pressure and adapted to be automatically fired at a second higher predetermined pressure, the provision of: a fuze member including a firing pin adapted for axial movement along an axial arming axis of said fuze member and a detonator means for detonating the explosive charge, said detonator means being located between said firing pin and main explosive charge, said detonator means and firing pin adapted to be moved relative to each other between an unarmed position wherein the firing pin, detonator means and explosive charge are out of alignment with said arming axis, and an armed position wherein the firing pin, detonator means and explosive charge are in alignment with said arming axis, said detonator means including a rotatable pinion member rotatably mounted about a transverse axis and carrying a cylindrical detonator charge exposed at both ends, said detonator charge having an axis out of alignment with said arming axis in said unarmed position, a pair of rack members mounted to move in opposite directions in a common plane normal to said rotatable pinion member axis, one of said rack members being mounted between said pinion member and the explosive charge and being in engagement with said pinion member and carrying a cylindrical relay charge having an axis substantially parallel to and out of alignment with said arming axis in said unarmed position, said other rack member being mounted between said pinion member and said firing pin and being in engagement with said pinion member and carrying a cylindrical primer charge having an axis substantially parallel to and out of alignment with said arming axis in said unarmed position, pressure responsive alignment means for moving said pair of rack members and said pinion member relative to each other from said unarmed position to said armed position wherein the axes of said primer, detonator, and relay charges are in axial alignment with said axial arming axis when the ambient exterior pressure equals a predetermined arming pressure, and holding and pressure responsive firing means for holding said firing pin stationary in said fuze member for automatically releasing and firing said firing pin to strike said primer charge in the armed position when the ambient exterior pressure is greater than said predetermined arming pressure required to arm the fuze member.

2. In a fuze member as stated in claim 1, said pressure alignment means includes spring means for resisting relative movement of said rack members and pinion member and for returning said rack members and pinion member to the unarmed position when the ambient exterior pressure is less than said arming predetermined pressure.

3. In a fuze member as stated in claim 2, including means for varying the pressure of said spring means and for changing the predetermined arming pressure at which the fuze member will become armed.

4. In a fuze member as stated in claim 1, wherein said pressure responsive alignment means includes a piston member having one end contacting one of said rack members and the other end in communication with the exterior, spring means resisting movement of said rack members from the unarmed position to the armed position, and adjusting means for varying the pressure of said spring means and for changing the predetermined arming pressure at which the fuze member will become armed.

5. In a fuze member as stated in claim 1, wherein said holding and pressure responsive firing means includes a thin, weakened section, and fluid passages communicating said weakened section of said holding means with the exterior, said weakened sections being of sufficient strength to hold said firing pin stationary when the ambient pressure is less than said predetermined arming pressure and failing at the ambient pressure equal to or greater than said predetermined arming pressure.

References Cited in the file of this patent

UNITED STATES PATENTS

| | | |
|---|---|---|
| 2,568,712 | Bowersett et al. | Sept. 25, 1951 |
| 2,953,092 | Walker | Sept. 20, 1960 |
| 2,958,279 | Haberland | Nov. 1, 1960 |
| 2,969,737 | Bild | Jan. 31, 1961 |
| 2,978,982 | Bianchi | Apr. 11, 1961 |

FOREIGN PATENTS

| | | |
|---|---|---|
| 542,485 | Canada | June 18, 1957 |